United States Patent [19]

Ashdown et al.

[11] 4,113,998

[45] Sep. 12, 1978

[54] TESTING ELECTRICALLY CONDUCTIVE LINES TO DETERMINE ELECTRICAL CHARACTERISTICS THEREOF

[75] Inventors: Glynn R. Ashdown, Hawthorn Woods; Thomas McCartney, Deerfield, both of Ill.; Bruce Holmes, Twickenman, England

[73] Assignee: Teradyne, Inc., Boston, Mass.

[21] Appl. No.: 622,054

[22] Filed: Oct. 14, 1975

[51] Int. Cl.² ............................................. H04B 3/46
[52] U.S. Cl. ................................ 179/175.3 R; 324/51
[58] Field of Search ................. 179/175.3 R, 175.3 F, 179/175.2 D; 324/51

[56] References Cited

U.S. PATENT DOCUMENTS

| 3,678,379 | 7/1972 | Arvay et al. | 324/51 |
| 3,808,381 | 4/1974 | Jacobs et al. | 179/175.3 R |
| 3,812,303 | 5/1974 | Stewart | 324/51 |
| 3,891,895 | 6/1975 | Wittlinger | 324/51 |

*Primary Examiner*—Douglas W. Olms

[57] ABSTRACT

A two-wired telephone testing system employing a low frequency test signal which is a submultiple of the power line frequency. This test signal is applied between the two-wires or between either wire at a point of potential reference (ground). A measure of the integrated value of the current between the connected points is then made for a period equal to one-half cycle of the applied signal with one polarity and one-half cycle with the polarity of the measured signal reversed. The integration periods are selected to be in phase with the applied signal for determining conductance and 90° out of phase for determining susceptance. Direct current measurement can also be made for the same time periods.

47 Claims, 7 Drawing Figures

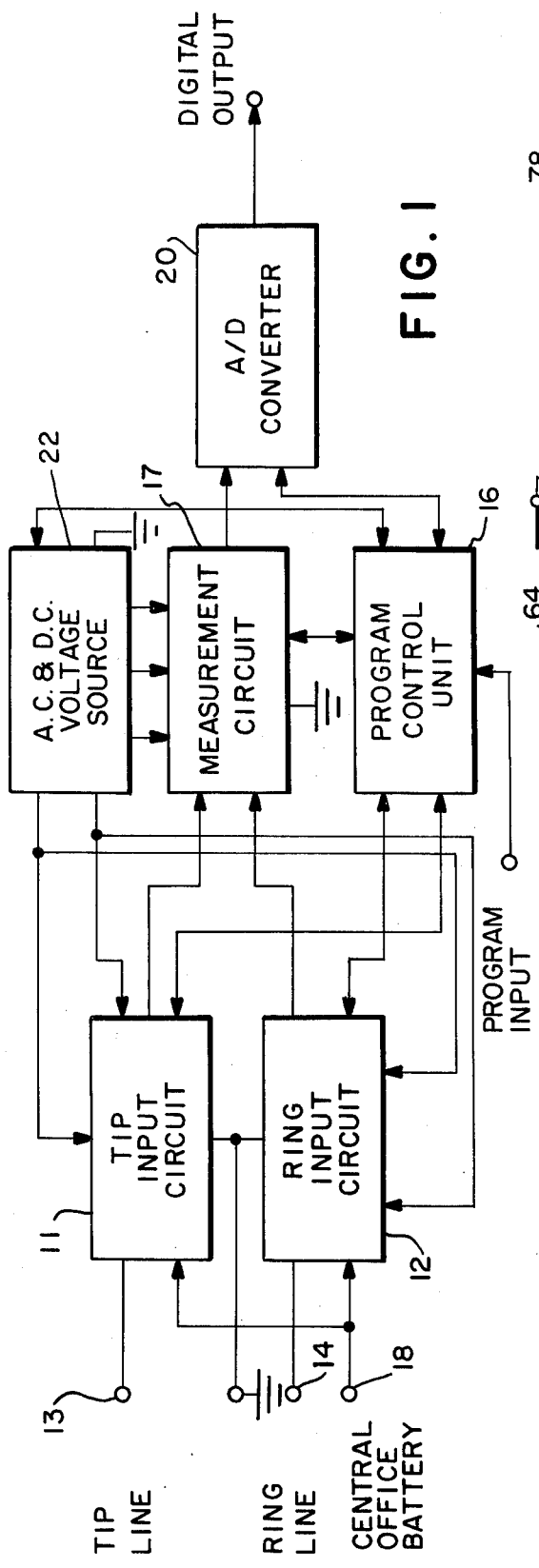
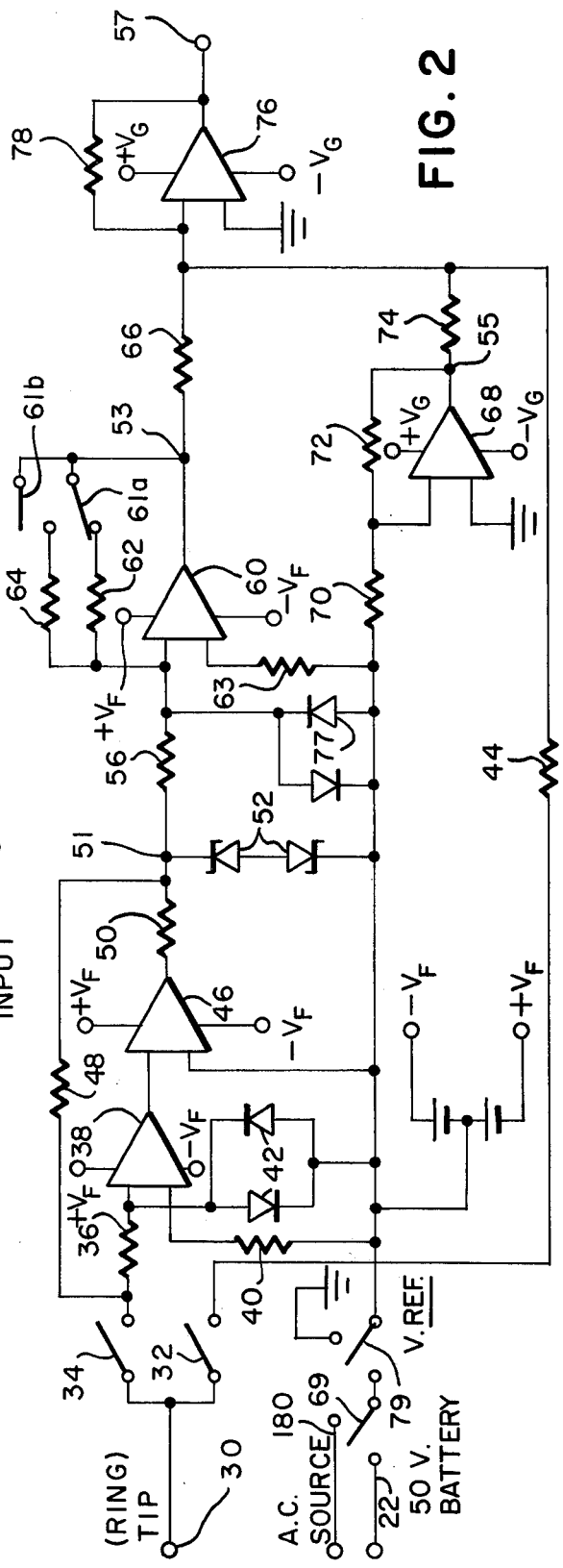

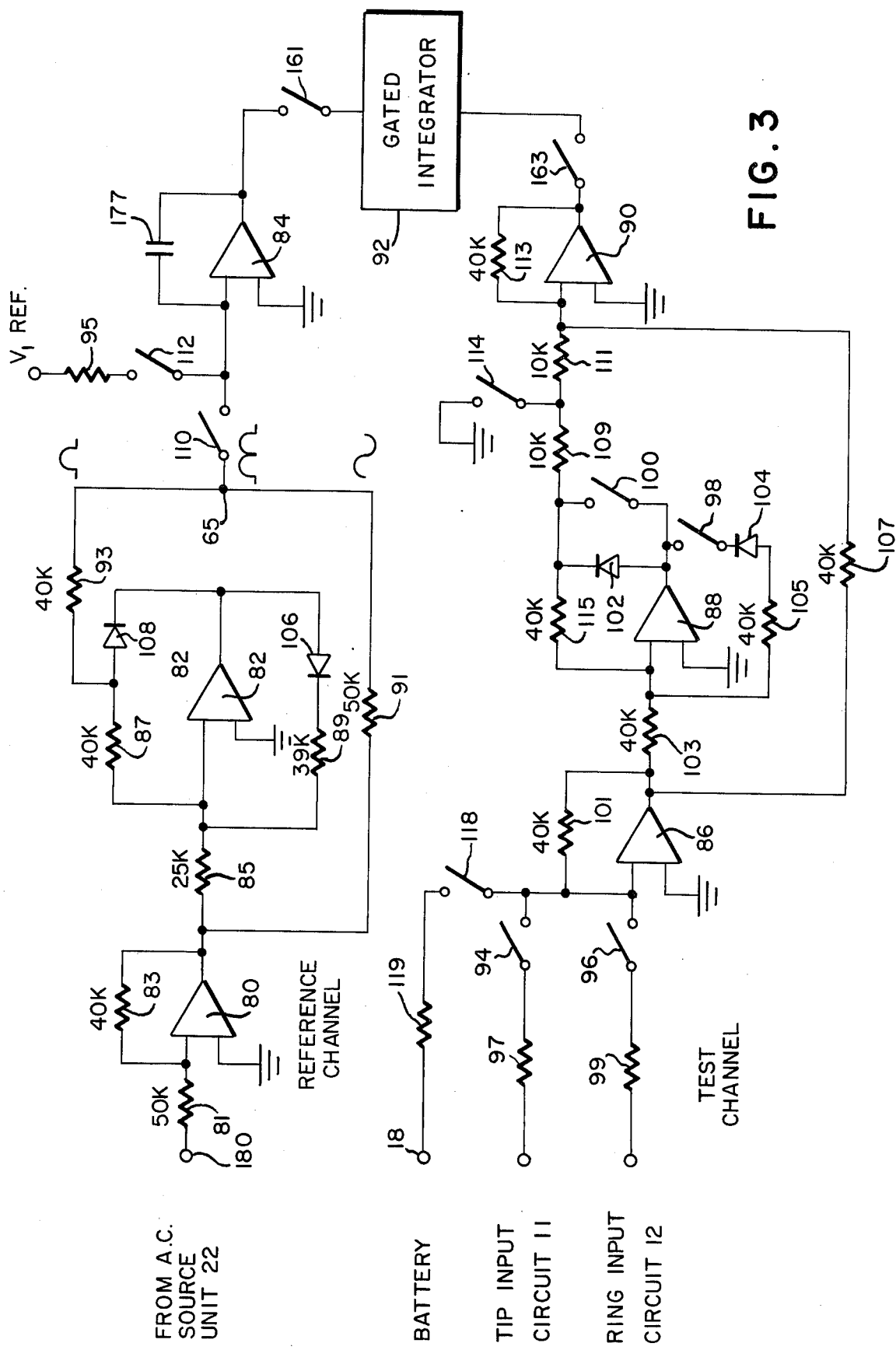

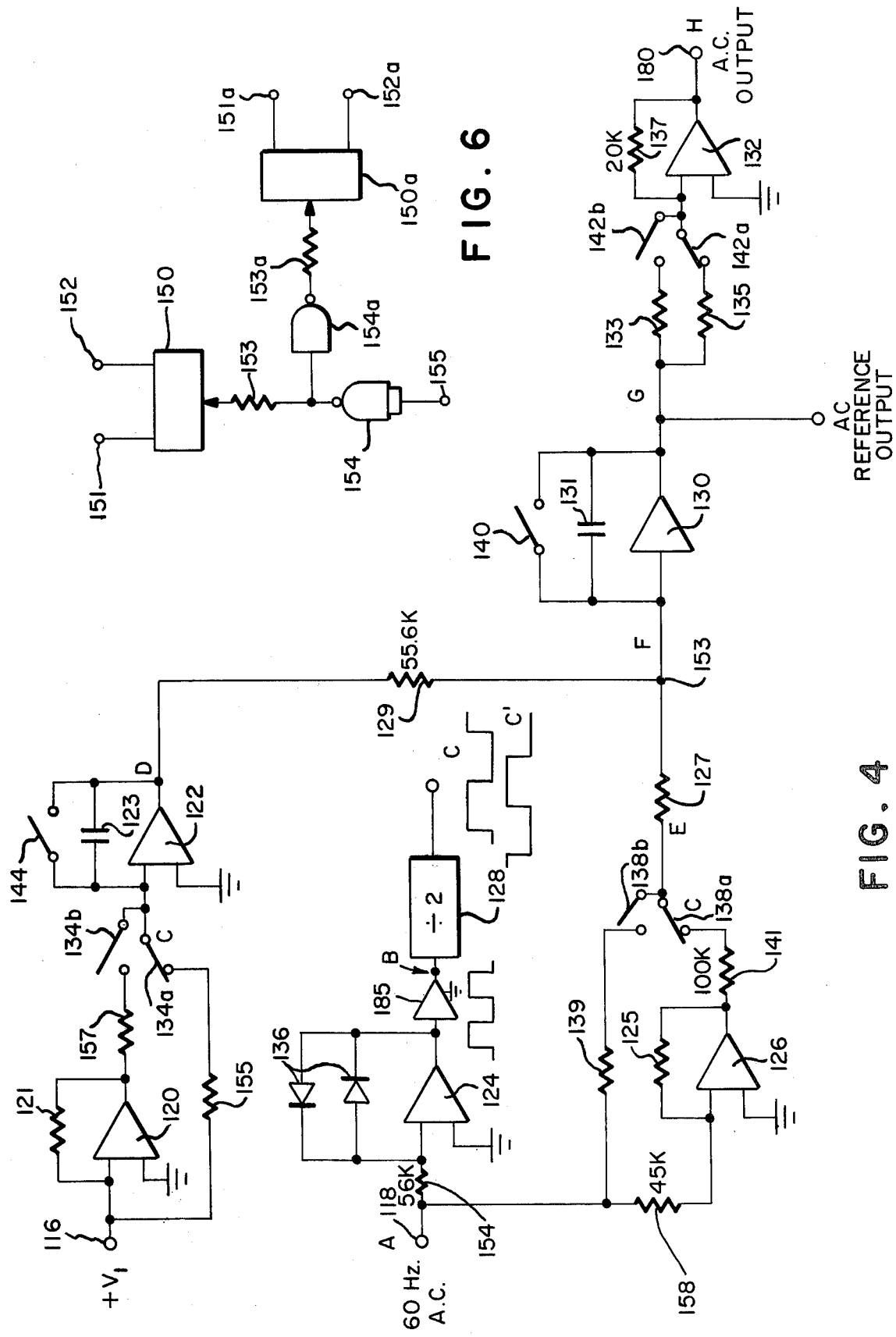

TESTING ELECTRICALLY CONDUCTIVE LINES TO DETERMINE ELECTRICAL CHARACTERISTICS THEREOF

BACKGROUND OF THE INVENTION

This invention relates in general to centralized testing of telephone cables and more particularly to a system for measuring from a central office the existence and location of faults in two wire telephone lines connected to that office.

In the service and maintenance of telephone system equipment, one important aspect is a rapid determination of the existence and location of problems directly related to the two wire telephone lines themselves. A telephone system central office has a large number, typically 10,000, two-wire telephone lines extending out from it to subscriber equipment. Each telephone line includes two wires, commonly referred to as "tip" and "ring," a large number of these wire pairs being included in a cable, with the cable jacket being connected to ground. At the central office connections to a 50 volt battery provide enabling power on the line. In the United States, the average length of lines extending from central office is 2.5 miles with a maximum length of approximately 10 miles.

One of the problems associated with maintenance service of the telephone lines lies in the relatively stringent requirements for maintaining the subscribers "on line." If a faulty line is detected or reported and the fault cannot be located and serviced in a relatively short period, then the subscriber is usually reconnected to a new pair of wires in order to keep his equipment in service. When this is done the previous pair of wires remain unused and consequently after a period of time cables which may have as many as 1800 pairs of telephone wires within are being only fractionally utilized. Increasing the demand for telephone connections then requires the very expensive project of laying new cables.

As would be expected, a great variety of approaches have been employed in an attempt to resolve these problems. Most such approaches have employed test signals at frequencies in the range of voice frequencies, since these are the operating frequencies of these lines. One significant problem associated with the use of frequencies of this value for long line testing lies in the difficulty of making determinations of susceptance and conductance for the entire length of the line. Such measurements are needed to determine capacitive loading. The resistive portion of the impedance increases with distance along the line, while the reactance portion decreases with distance along the line and, for frequencies in the order of one kilohertz these impedance values cross at approximately three miles. Accordingly, this distance presents a limiting distance for the determination of characteristics of capacitance loading with a test frequency of 1 kilohertz. Additional problems arise from the necessity of protecting any measurement circuit from damage arising either from continuous direct low impedance connection to the battery through a short to a telephone wire connected to the battery, or from catastrophic high voltage, such as lightning striking the line when it is connected to the measurement circuit.

In order to improve the efficiency of these prior art testing systems centralized computers have been employed both to perform algorithms on various combinations of test results in order to determine particular line faults characterized by specific combinations of measurement results, and also as a storage of the data base which stores all of the updated information concerning the lines emanating from a particular central office. This data base information would normally include the length of the lines, the types of terminations and the types of equipment tied onto a line. Since many of these factors change fairly frequently, this data base needs to be continuously updated.

It is therefore a primary object of the present invention to provide a method and apparatus for testing the quality of telephone lines for distance out to more than 10 miles where the measurement can be made rapidly and economically to provide an indication of both the existance and location of problems on the line.

SUMMARY OF THE INVENTION

Broadly speaking, in the present invention, the measurement apparatus is connected to each individual pair of lines at the central switching office directly onto the line terminals. Each line is completely tested in a two second period, thereby permitting testing during the low traffic hours on a daily basis for all the lines of each central office. Each test cycle includes direct current tests of the resistance between the tip and ring wires in each direction, as well as tests of resistance between battery and the tip and the ring wires, and between the ground and the tip and the ring wires. A measurement is also made of the total amount of alternating current hum or noise on the wire by means of rectification of any signals on the tip and ring wires, with the central office battery disconnected. In a third portion of the measurement cycle, AC measurements are made by applying alternating currents signals between combinations of the tip wire, the ring wire, and the ground conductor for a specific measurement period both in phase and in quadrature. For each measurement the current signal is integrated and appropriate software is utilized to compute the susceptance and conductance between each pair of conductors and between each conductor and ground from which is determined the capacitance across the line, the location of those capacitive loads and the length of the line.

It has been found that if the frequency of the test signal is established at a sub-multiple of the line frequency, for example, 30 Hz for a 60 Hz line frequency, and the measurement period for this frequency is established as one cycle of this frequency, for example, 33.33 milliseconds for a 30 Hz frequency, measurements of susceptance and conductance may be made for lines as long as twenty miles. In this measurement method the polarity of the negative going half cycle is reversed and the resultant waveform is integrated over the measurement period, thereby eliminating contributions to "noise" from 60 cycle sources. While, in the specific embodiment a measurement period equal to the period of one full cycle of the test signal is employed, it will be understand that multiples of this period can also be employed without losing the advantages of noise suppression and signal enhancement achieved. Generally, test signals at frequencies which are odd multiples of 30 cycles may be employed, with a measurement period preferably equal to two cycles, of the line frequency.

DESCRIPTION OF THE DRAWING

In the drawing:

FIG. 1 is an illustration in block diagrammatic form of a telephone testing apparatus constructed in accordance with the principals of this invention;

FIG. 2 is an illustration generally in schematic form of a tip input circuit suitable for use in the practice of this invention;

FIG. 3 is an illustration generally in schematic form of a measurement circuit suitable for use in the practice of this invention;

FIG. 4 is an illustration in schematic form of a AC-DC voltage source circuit suitable for use in the practice of this invention;

FIG. 6 is an illustration of a solid state gating switch suitable for use in the circuits of this invention;

DESCRIPTION OF PREFERRED EMBODIMENTS

Figure 5:
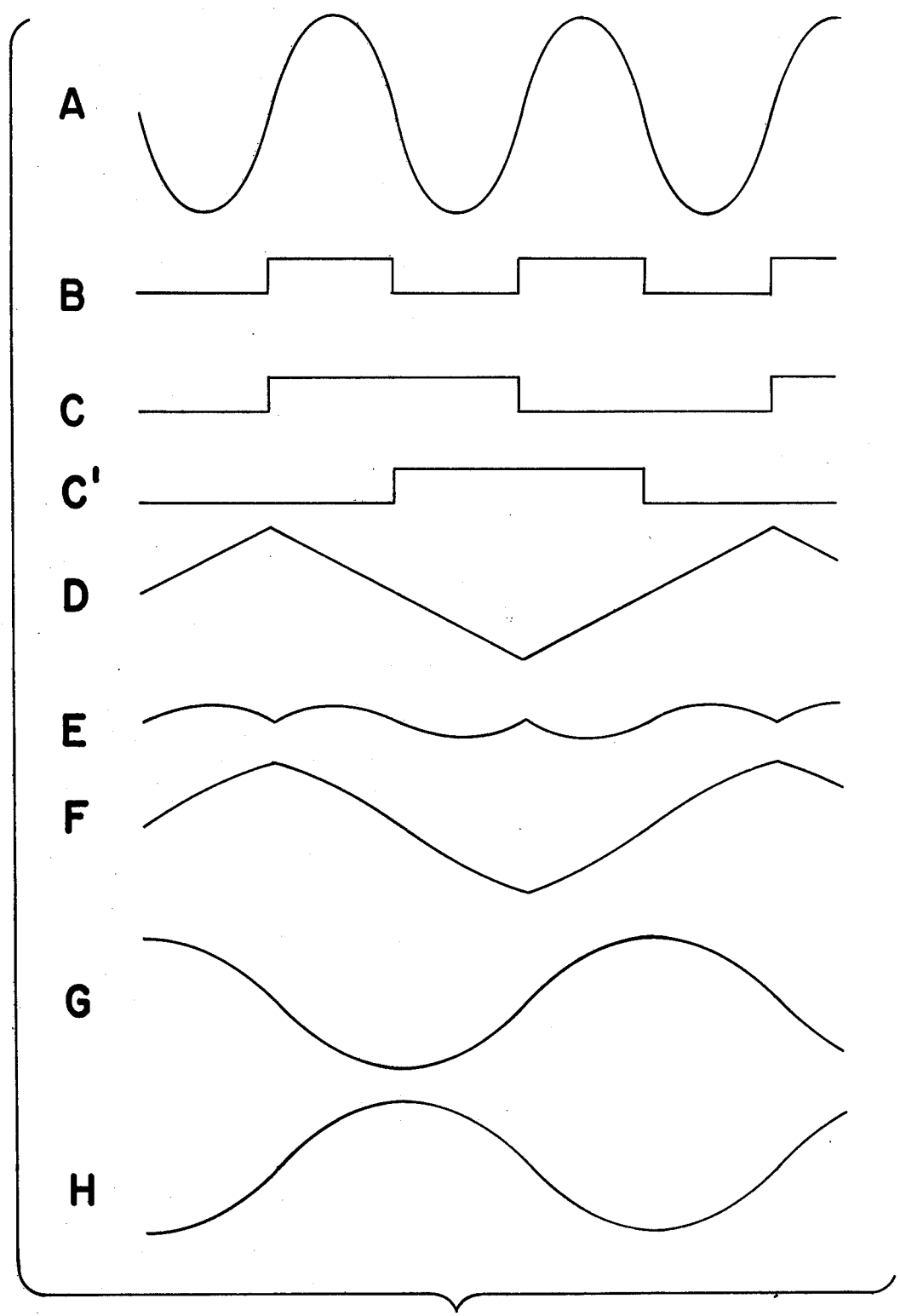
FIG. 5 is an illustration of waveforms that are generated at various points of the circuit of FIG. 4.

In FIGS. 1 through 6 there is illustrated apparatus illustrating one preferred embodiment of this invention suitable for carrying out the testing method of this invention. As previously indicated, the testing method of the invention is one in which characteristics of two-wire telephone lines may be routinely tested from the central office switch points, to which those lines are connected for normal operation. The lines are tested, not only for faulty conditions, such as shorts, opens, or capacitive or resistive loads, but also to determine the normal characteristics of the line. In this latter category, the testing apparatus and method produces information from which the length of the line may be ascertained, the type of termination of the line and the number, location and types of equipment connected to the line. These characteristics are ascertained by making a comprehensive measurement series for each two-wire line. While the line itself comprises a pair of conductors or wires, it will be understood that two additional electrical connection points at the central office are utilized in these measurements. One of these two additional measurement points is of course electrical ground, while the other is the central office battery connection which normally supplies direct current voltage to the lines. In telephone system terminology, one of the two conductors of the two-wire line is referred to as "tip," while the other is referred to as "ring." In the usual telephone central office arrangement, a pair of switch points are arranged for each of the "tip" and "ring" wires, such that these wires may be completely disconnected and left disconnected at the central office, or either one may be connected directly to battery or directly to ground.

In each testing series, three basic measurements are made, one involving direct current resistive measurements, one involving measurement of alternating current voltage signals present on the line and a third involving measurement of conductance and susceptance utilizing a specific low frequency alternating current voltage signal applied between the telephone wires and ground. As will be subsequently described, the measured values are converted into digital signals, which are in turn supplied to an appropriately programmed computer for determining from these signals the specific line characteristics being tested for.

With reference now to FIG. 1, the preferred embodiment of the test apparatus is illustrated in block diagrammatic form. A tip input circuit 11 has an input terminal 13 which may be connected to the tip wire of the telephone line to be tested. A similar ring input circuit 12 has an input terminal 14 which may be connected directly to the ring wire of the telephone line. Both the tip input circuit 11 and the ring input circuit 12 have supplied to them, as inputs, a connection from the central office battery terminal 18 and from the alternating current and direct current voltage source 22. Output signals from the tip input circuit 11 and the ring input circuit 12 are provided to measurement circuit 17, which also receives input signals from the alternating current and direct current voltage source 22. The output of measurement circuit 17 is provided to an analog to digital converter 20, which in turn provides a digital output. The sequencing of operation of the circuit is controlled by program control unit 16, which is shown with two-way connections to each of the other units.

As above indicated this testing circuitry is arranged so that the tip input circuit 11 and the ring input circuit 12 may be connected directly to the tip and ring wires of a line to be tested, with the two other input terminals of the test circuit connected to the electrical ground and to the central office battery terminal 18. The function of the tip input circuit 11 and ring input circuit 12 is to provide output signals indicative of the current between the tip or ring line and ground under various testing conditions. These testing conditions include the central office battery being connected to one or another of the lines, the application of a specific alternating current signal at low frequency being applied to one or another of the lines, as well as the measurement of the current with no voltage source from the testing circuit connected to either line. These current signals from the tip input circuit 11 and the ring input circuit 12 are applied to a measurement circuit which provides a direct current output signal indicative of the value of the received input signals, once again under a variety of specifically controlled circumstances. Thus, in the measurement circuit, a direct DC current path may be provided so that the integrated value of the measured DC current for a specific measurement period may be represented by the output signal from the measurement circuit 17. The output from measurement circuit 17, in one set of circumstances, represents the integrated value of a full wave rectified signal from the tip or ring input circuit, under conditions when no voltage from the circuit has been applied to the line. Measurements of the current during the application of a low frequency, preferably 30 Hz, for a 60 Hz line frequency, alternating current signal to the appropriate tip or ring terminal are carried out both in phase and in quadrature for specific gating periods in order to obtain values of susceptance and conductance under conditions permitting a high signal to noise ratio.

In FIG. 2 there is illustrated a tip input circuit 11. The tip input circuit 11 and the ring input circuit 12 are identical circuits and accordingly the configuration shown in FIG. 2 may serve as either the ring circuit or the tip circuit. The tip circuit 11 includes an input terminal 30 which may be connected to either the ring or the tip line and which is also connected to one side of a pair of switches 32 and 34. The other side of switch 32 is connected through resistor 44 directly to the inverting input of amplifier 76, which is an operational amplifier connected with a negative feedback through resistor 78, and serves as an output high voltage amplifier from the tip circuit to the output terminal 57.

Switches 32 and 34 are reed relays and switches 79 and 69 are mercury wetted relays. While, the other switches referred to in the description of the circuitry herein, are illustrated schematically as ordinary single pole, single throw switches, in practice these switches would usually be formed as series-shunt solid state switches controlled by a logic input. A typical series-shunt solid state switch is shown in FIG. 6 in which field effect transistors 150 and 150a serve as the active elements with terminal 151 forming one terminal of the switch and terminal 152 the other. A switching signal is applied to input terminal 155 of inverter 154, with the output of this inverter being coupled to both the gate 153 of the field effect transistor 150 and the input of inverter 154a to control the shunt path. In response to a logic high applied at input terminal 155 the transistor 150 is biased into conductance thereby providing a closed path between terminal 151 and 152, effectively closing the switch. With a logic low at input terminal 155 the transistor 150 remains in a non-conducting state and the high impedance then existing between terminal 151 and terminal 152 represents the open condition of the switch, while the current path through transistor 150a provides a shunt. The logic for these switches is operable at values of 0 volts with reference to terminal 152a for logic high and −15 volts for logic low.

In the circuitry of FIG. 2 the second terminal of switch 34 is connected through input resistor 36 to the inverting input of operational amplifier 38. The non-inverting input of operational amplifier 38 is connected through resistor 40 to the arm of switch 79 labeled $V_{ref}$. For surge protection this same arm is coupled through a pair of parallel connected, oppositely poled diodes 42 connected to the inverting input terminal of operational amplifier 38. The terminal $V_{ref}$ of switch 79 may be connected, in one position of the switch directly to electrical ground and in the opposite position to the arm of switch 69 which in one position is connected to an alternating current source 180 and in the opposite position is connected directly to the terminal 22 of the 50 volt battery. The arm of switch 79 is also connected to the center point of a bias voltage supply including batteries 15 and 19 and terminals $-V_F$ and $+V_F$. While the voltage is shown as supplied from batteries, it will be understood that any form of floating voltage supply may be employed. As indicated in FIG. 2, the bias voltages $+V_F$ and $-V_F$ are connected to amplifiers 38, 46 and 60, thereby floating these amplifiers about $V_{ref}$ as a center point. Amplifiers 68 and 76 are supplied with bias voltages $+V_G$ and $-V_G$, which are supplied from a voltage source (not shown) referenced to electrical ground for the circuit of FIG. 2.

The output of amplifier 38 is connected to the input of a second amplifier 46, the other input terminal of that amplifier 46 being connected to the $V_{ref}$ arm. This amplifier 46 is a buffer amplifier providing high current capability to line resistor 48. The output from amplifier 46 is supplied through resistor 50 to output terminal 51 and the signal at 51 is fed back through feedback resistor 48 directly to the second terminal of switch 34. For surge protection, a pair of zener diodes 52 are connected between terminal 51 and the $V_{ref}$ point. Terminal 51 is connected through resistor 56 to the inverting input terminal of operational amplifier 60, which has its non-inverting terminal connected through resistor 63 to the $V_{ref}$ terminal. The operational amplifier 60 may be connected with negative feedback through either one of two resistors 62 and 64. Resistor 64 is 10 times the value of resistor 62 and, depending upon which one of these two resistors is connected into the feedback circuit through switch 61, the amplifying stage, including operational amplifier 60 exhibits a gain of unity or a gain of ten. The output terminal 53 of operational amplifier 60 is connected through summing resistor 66 to the inverting input terminal of summing amplifier 76. The $V_{ref}$ terminal 67 is connected through input resistor 70 to the inverting input of operational amplifier 68, which is provided with feedback resistor 72 and the output terminal 55 of this operational amplifier 68 is connected through summing resistor 74 to the inverting input terminal of operational amplifier 76. The non-inverting input terminal of operational amplifier 68 is connected to ground.

The overall tip circuit performs the function of converting the current signals between the tip terminal 30 and ground into a voltage signal with reference to ground under conditions where either the alternating current source signal is applied to that terminal or the 50 volt battery is applied to that terminal. As previously discussed the purpose of applying the 50 volt battery is to make direct current measurements between the tip or ring wire and ground, while the application of the alternating current source reference permits alternating current measurements, namely susceptance and conductance, to be carried out in order to determine the capacitive loadings on the lines.

The signal to be measured may generally be considered as the current through the feedback resistor 48 of the first stage, which produces a voltage at terminals 51 equal to $IR_{48} + V_{ref}$. Under surge conditions, terminal 51 is prevented from swinging too far from the operational point of the amplifiers by virtue of the zener diodes 52. The signal at terminal 51 is amplified in amplifier 60 so that the signal appearing at terminal 53 is equal to $GIR_{48} + V_{ref}$ where G is the gain of the amplifying stage 60, the value of which depends upon which of the feedback resistors 62 or 64 is switched into the circuit. This output signal which appears at junctions 53, is then provided through summing resistor 66 to the input of summing amplifier 76. The $V_{ref}$ signal appearing at terminal 67 is applied through resistor 70, amplifier 68 and summing resistor 74 to the summing junction at the input of amplifier 76. Resistor 70 is selected to be eight times the value of resistor 72 and accordingly, if the amplifier 68 has unity gain, the value of $V_{ref}$ appearing at output terminal 55 is ⅛th the actual value of $V_{ref}$. Since the summing resistor 66 is eight times the value of summing resistor 74, then the value of $V_{ref}$ from amplifier output terminal 55 is precisely subtracted from the signal appearing at terminal 53 and accordingly the summed input to amplifier 76 equals $GIR_{48}$, a voltage output referenced to ground and proportional to the current, I, flowing between the tip wire and ground under the selected test conditions.

One of the advantages of the above-described circuit is the surge protection provided for the overall measurement circuit even under conditions when, either a relatively low voltage, such as 110 volts AC is continuously connected between the tip or ring wire and ground, or a catastrophic voltage, such as is produced when lightning strikes a wire, is connected, producing a short very high voltage transient. This surge protection is afforded by forming resistor 48 as a 1000 ohm, 10 watt resistor with resistor 36 being formed as a 10,000 ohm, 1 watt resistor. Telephone system standards require that there be a circuit limitation such that even a lightning strike will produce no more than 600 volts maximum on a wire. Resistors 36 and 48 are made to withstand 1,000 volts lightning surge or continuous connection to 110 volt AC.

This tip circuitry is arranged then so that a DC or AC voltage may be applied to the tip wire and while the appropriate testing voltage is applied the circuit produces an output signal which is a voltage proportional to the current between the connected wire and ground with this output voltage signal referred to ground.

Suitable values for the resistors illustrated in FIG. 2 are contained below in Table I.

TABLE I

| Resistor 36 - 10K | Resistor 56 - 20K | Resistor 70 - 40K |
|---|---|---|
| Resistor 40 - 12K | Resistor 62 - 20K | Resistor 72 - 5K |
| Resistor 44 - 400K | Resistor 68 - 18K | Resistor 74 - 5K |
| Resistor 48 - 1K | Resistor 64 - 200K | Resistor 78 - 40K |
| Resistor 50 - 85 | Resistor 66 - 40K | |
| | AMPLIFIER | |
| 38 LM 218 | | |
| 46 LH 0002 | | |
| 60 LM 308 | | |
| 68 LM 301 | | |
| 76 LM 301 | | |

In FIG. 4 there is illustrated an alternating current and direct current source circuit 22. The purpose of the circuit is to provide an alternating current reference output for use in the measurement circuit 17, an alternating current test signal output for application to the telephone wire in order to make alternating current measurements, as well as square wave output signals in order to control phase sensitive detection in the measurement circuit. The line 118 providing 60 Hz sine waves is coupled to the inverting input of operational amplifier 124, which has its other input terminal connected directly to ground. A pair of oppositely poled diodes 136 are connected as negative feedback between the output terminal and inverting input terminal of operational amplifier 124, thereby providing at its output a 60 Hz square wave. With reference to FIG. 5 the waveforms at various points in the circuitry of FIG. 4 are shown. Thus, at the input terminal 118, a 60 Hz AC signal of waveform A is applied and the output from the operational amplifier 124 is a 60 Hz square wave as shown in waveform B. The 60 Hz sqaure wave at the output terminal of operational amplifier 124 is applied to a ÷2 circuit 128, which has two output signals of different phase. Each of the output signals is a 30 Hz square wave, the square wave C leading the square wave C' by 90°. The inputs to the summing junction 153 at the input to amplifier 130 are supplied from one channel commencing at 60 Hz alternating current terminal 118, and from a second channel commencing at DC terminal 116. The inverting input terminal of operational amplifier 126, which has negative feedback resistor 125 connected across it, is connected via resistor R158 to the 60 Hz alternating current terminal 118. The output terminal of operational amplifier 126 is connected through resistor 141 to one terminal of switch 138. The other terminal of switch 138 is connected directly through resistor 139 to the input terminal 118. The switch 138 is operated by the output waveform C and therefore opens and closes 30 times per second providing waveform E at its output. The waveform E is one full cycle of 60 Hz alternating current signal followed by an inverted full cycle of alternating current 60 Hz signal. This signal is applied through summing resistor 127 to the summing point 153 at the input of operational amplifier 130.

DC reference terminal 116 has applied to it a voltage $V_1$ which is applied directly through resistor 155 to one terminal of double pole, single throw switch 134. This same signal is applied through operational amplifier 120, which has a negative feed back resistor 121, and then through resistor 157 to a second terminal of switch 134. The arms of switch 134 are driven by waveform C (30 Hz square wave) between these two positions providing as an output then a 30 Hz square wave with a precise amplitude of $V_1/R_1$, where $R_1$ = resistance of resistors 155 and 157. This waveform is applied to integrating amplifier 122 and the output waveform D of this integrator is applied through summing resistor 129 to the summing junction 153 at the input of operational amplifier 130. Operational amplifier 130 is also connected to serve as an integrator and, at the output of this integrator 130, there appears the waveform G. The addition of waveforms D and E at the input 130 produces an input current waveform F in which the triangular waveform D has been slightly rounded by the compensation waveform E. The integrated output waveform G from integrator 130 is therefore a low distortion, 30 Hz sinusoidal signal and serves as a 30 Hz output alternating current reference. This signal is also supplied through a switching network to the input of amplifier 132. The output waveform H appears then at the output of amplifier 132 and is 180° out of phase with the AC reference output. The attenuation of stage 132 will depend upon which one of the two input resistors 133, 135 is switched into the circuit by switch 142. By employing input resistor 133 an attenuation of ten may be achieved and the smaller signal will be employed when the waveform is to be applied to longer telephone lines. The waveform H is applied as the test signal to terminal 180 of the tip (or ring) circuit illustrated in FIG. 2, and is the waveform supplied to terminal 79 in the reference channel of the measurement circuit illustrated in FIG. 3.

It should be noted that not only are two 180° out of phase 30 Hz waveforms produced by this source circuit, but also square waves at this same frequency are produced both precisely in phase and in quadrature with the alternating current reference output. Since the frequency of the manufactured alternating current outputs are 30 Hz and since the source signal for this circuit is 60 Hz then the zero crossovers of the 60 Hz signal provide an ideal, precise reference source for generating the quadrature square wave.

In FIG. 4 the switches 144 and 140, appearing across operational amplifiers 122 and 130 respectively are centering switches which are programmed to close for a short period, typically a few microseconds at the point when the input waveform passes through zero voltage level. At this point the potential across the associated capacitor should be substantially zero and hence there should be no disruption in the waveform. By closing the shorting switch at this particular time, it is ensured that the zero crossing occurs at a zero DC level and prevents progressive drifting of the operational amplifier away from a zero DC level center of operation.

In FIG. 3 there is illustrated suitable circuitry for the measurement circuit 17. The function of measurement circuit 17 is to provide analog output signals from gated integrator 92 to the analog to digital converter 20. The signals are provided to the gated integrator 92 both through a signal processing reference channel from the AC-DC source unit 22 and through a signal processing test channel from a selected one of the terminals representing the tip input circuit 11 output, the ring input circuit 12 output and battery terminal 18. The signal from the reference channel from the AC-DC source unit 22 output provides a reference signal to the gated integrator 92, while the signal from the test channel provides a signal the value of which is to be determined. Thus the gated integrator 92 will provide at its output an analog signal, which in one portion of the cycle represents a signal derived from the reference source, and in the other portion of its cycle a signal derived from the measurement test signal. These output signals from the gated integrator 92 may then be used as the input signals to an analog to digital converter, thereby providing an accurate digital output signal representative of the value of the test signal being measured.

In the measurement circuitry, the signal from the AC-DC source unit 22 provided to terminal 180 is, as above described, represented by the H waveform. Terminal 180 is connected through input resistor 81 to the inverting input terminal of buffer amplifier 80, which is characterized by a gain of 0.8 and therefore produces a waveform at its output terminal which is equal in amplitude to 0.8 of the input amplitude and 180° out of phase from the input signal. The output of buffer amplifier 80 is provided through input resistor 85 to the inverting input terminal of operational amplifier 82. The output of operational amplifier 82 is connected through two feedback paths, each including one of the oppositely poled diodes 106 and 108 and resistors 89 and 87 respectively. An output is taken from the junction between resistor 87 and diode 108 and passed through resistor 93 to a summing junction 65. A signal is provided directly from the output of operational amplifier 80 through resistor 91 to the same summing junction 65. The impedances of resistors 85, 87, and 93 are selected such that the signal taken from the junction between resistors 87 and diode 108, when applied to the center junction 65 is twice the signal in the alternative path through resistor 91. The waveform supplied to terminal 65 represents, on the one hand a one-half cycle of the current waveform from amplifier 80 equal to V/R, on the other hand a full cycle current waveform at amplitude equal to $v/2R$. The summation waveform at terminal 55 is then a full wave rectified version of the 30 Hz AC signal appearing at the output terminal of amplifier 80.

Switch 110 is operated from program control unit 16 and serves as a gate which is opened periodically for a time $\tau_m$, which in the usual case would be set equal to one full cycle of the 30 Hz reference signal, that is, for 33.33 milliseconds. When switch 112 is open, as it will be during AC operation, the rectified waveform appearing at junction 65 is applied to integrator 84 and the integrated output level represents a reference signal derived from the same AC source as the 30 Hz test signal. Thus variations in the source are compensated for in a dual slope integration since the reference signal and the value to be measured are derived from the same AC source. Switch 161 is used to apply this reference source at appropriate times in the operational cycle into the gated integrator 92. In the usual dual slope converter, the test signal is first applied for a specific time period and thereafter a reference source of opposite polarity is applied to the integrator until a zero crossover occurs, the time required to reach the crossover being represented digitally as a value of the test signal.

In the test channel of this measurement circuit, either the output from the tip input circuit 11 or from the ring input circuit 12 may be connected into the measurement circuitry. For purposes of determining the difference in current between the tip and ring lines, suitable circuits for measuring the difference in these circuits may be employed to provide this differential input to the measurement circuit. If, for example, the tip input circuit 11 is to be connected, then switch 94 is closed and switches 118 and 96 are left open. The signal, then, from the tip input circuit 11 is passed through buffer amplifying stage 86 through resistor 103 to the inverting input terminal of amplifier 88. The amplifier 88 is connected with one feedback path including diode 102 and resistor 115 and a second feedback path including switch 98, diode 104 and resistor 105. A second switch 100 is positioned so that, when closed, it shorts out diode 102. An output signal is taken from the junction between diode 102 and resistor 115 and applied through the series combination of resistors 109 and 111 to a summing junction at the inverting input terminal of amplifier 90. The output from amplifier 86 is also applied directly through resistor 107 to that same summing junction. Switch 114 is connected from the junction between resistors 109 and 111 directly to ground and, as will be explained below, this switch is operated by the 30 Hz square wave outputs C and C' to act as a phase sensitive detector for signals passed through this test channel. The output signals from output amplifier 90 are then passed through measurement switch 163 to the gated integrator 92. The switch 163 is operated to pass signals from the test channel for a period precisely equal to $\tau_m$ to the gated integrator 92. The switch will be closed for these periods $\tau_m$ at a time when switch 161 is open and in proper sequence to provide for operation, as above described, of a dual slope converter.

The switches 98 and 100 are controlled by program control unit 16. During application of the 30 Hz test signal, switch 98 is left open and switch 100 is closed. Under these conditions amplifier 88 operates as a unity gain inverting amplifier so that the signal provided to the summing junction at the input of amplifier 90 represents a 30 Hz signal, 180° out of phase with the input signal to amplifier 88. A signal in phase with the signal at the input to amplifier 88 is provided through resistor 107 to the same summing junction. The resistor 107 is twice the value of the sum of resistors 109 and 111, so the weighted contribution of the signal through resistor 107 is half that through the resistors 109 and 111. In operation the phase sensitive detector switch 114 is closed during one-half cycle during the 30 Hz test signal thus shorting out the contribution to amplifier 90 from the inverting amplifier and, during this half cycle, the in phase half cycle of the 30 Hz signal derived from the output of amplifier 86 with unity gain is applied to the input of amplifier 90. Switch 114 is opened during the next half cycle, thereby allowing an inverted half cycle to the applied to the summing junction at the input of amplifier 90 through resistors 109 and 111 and with an effective voltage amplitude twice that of the in phase signal provided through resistor 107. Accordingly, during the second half cycle the summed contributions from the two inputs to the summing junction represents a unity gain half cycle 180° out of phase with the output signal from amplifier 86. For a full measurement period, then, the 30 Hz waveform produces two half cycles of the same polarity at the input to amplifier 90. Amplifier 90 serves as a buffer amplifier and the signal from amplifier 90 is passed through switch 163 to gated integrator 92. Switch 163 is operated for a period $\tau_m$, where $\tau_m$ is selected to be exactly equal to one cycle of the 30 Hz signal. Thus the signal applied to the integrator 92 from amplifier 90 will represent two half cycles of the same polarity for each measurement.

In this operation, the effect is to provide a full wave rectified 30 Hz signal, without, however, full wave rectifying signals of higher frequency. Thus 60 Hz noise or signals on the lines will have no net contribution to this output signal, since each measurement period will include even multiples of a full cycle and hence have equal contribution from both polarities. Additionally any DC bias appearing on the tip or ring wires will be eliminated since the polarity is reversed for each half cycle of the 30 Hz and hence a DC bias will be positive during the first half cycle and negative during the second half cycle.

It will be understood that while the measurement period $\tau_m$ is selected as one full cycle at 30 Hz, the time may be set longer, provided that it is increased in even multiples of 30 Hz full cycles. Additionally if DC bias is not a problem, this measurement time could be set to be equal to one half of a full cycle at 30 Hz, while still obtaining the advantage of inhibition of contributions from 60 Hz and harmonics of 60 Hz.

The phase sensitive detector switch 114 is operated by 30 Hz square waves of the waveform illustrated in C and C'. Thus the gate is opened and closed in one instance in phase with the 30 Hz drive signal and, in the other instance, in quadrature phase with the drive signal. The gate 163 is operated by a similar waveform to that operating switch 114, with gate 163, however, being operated on the full cycle basis rather than the half cycle basis. The in phase integrated value provides then a measurement of the conductance between the selected wire (tip or ring) and ground, while the quadrature phase signal provides a measure of the susceptance.

For direct current measurements testing the impedances of the tip and ring wires, the particular line to be tested is selected by closing one of the switches 94 and 96, the phase sensitive detector switch is left closed and the DC signal is provided directly to the input terminal of amplifier 90 through the impedance path including resistor 107. Switch 163 is maintained closed for an appropriate measurement period. Under these circumstances, in the reference channel, switch 110 is left open and switch 112 is closed to provide a DC reference signal from the reference $V_{1\ ref}$.

In the direct current mode the voltage applied to the tip input circuits and the ring input circuits come from the central office battery terminal 22 (in FIG. 2). In the measurement circuit shown in FIG. 3, provision is made for connecting a signal from the battery terminal 18 to the input of operational amplifier 86, thereby permitting an independent measurement of the DC value of this battery. Resistor 119 is ten times the value of resistors 97 and 99 and therefore reduces the voltage from the battery terminal 18 by a factor of ten to bring it at the output of amplifier 86, close to the five volts desirable center operating voltage of the measurement circuitry. By closure of switch 118 the signal can be applied directly to the inverting input terminal of amplifier 86.

It will be understood that in DC measurements the switch 163 is operated for periods $\tau_m$, thereby providing for suppression of 60 cycle and 60 cycle harmonic noise components.

In order to measure the value of AC noise on the lines to be tested, the appropriate one of switches 94 and 96 is closed, switch 67 in FIG. 2 is connected to ground, switch 114 is left open, as is switch 100 and switch 98 is closed. Under these conditions all AC signals on the connected tip or ring wire will be full wave recitified with unity gain. In the reference channel switch 112 is closed and switch 110 opened, thereby providing a D.C. reference signal, $V_{1\ ref}$.

In Table II there is illustrated a chart for the value of the components in FIGS. 3 and 4.

TABLE II

| Resistor | Kilohms | Capacitors | |
|---|---|---|---|
| 81 | 50 | 123 | 100nf |
| 83 | 40 | 131 | 100 f |
| 85 | 25 | 177 | 330nf |
| 87 | 40 | | |
| 89 | 39 | Diodes | |
| 91 | 50 | 102 | GENERAL |
| 93 | 40 | 104 | PURPOSE |
| 95 | 125 | 106 | SILICON |
| 97 | 40 | 108 | DIODES |
| 99 | 40 | | |
| 101 | 40 | Amplifiers | |
| 103 | 40 | | |
| 105 | 40 | 80 | LM 301 |
| 107 | 40 | 82 | LM 301 |
| 109 | 10 | 84 | LM 301 |
| 111 | 10 | 86 | LM 301 |
| 113 | 40 | 88 | LM 301 |
| 115 | 40 | 90 | LM 301 |
| 119 | 400 | 120 | LM 301 |
| 121 | 40 | 122 | LM 308 |
| 125 | 40 | 124 | LM 301 |
| 129 | 55 | 126 | LM 301 |
| 133 | 200 | 130 | LM 308 |
| 135 | 20 | 132 | LM 301 |
| 137 | 20 | | |
| 139 | 200 | | |
| 141 | 100 | | |
| 155 | 100 | | |
| 157 | 100 | | |
| 156 | 40 | | |
| 158 | 40 | | |
| 154 | 56 | | |

While the AC measurements are shown as carried out by 30 Hz sine waves, again it will be understood that the principles of the invention apply equally to 30 Hz signals of other waveforms, such as square waves, providing that the waveform is substantially symmetrical.

Figure 7:
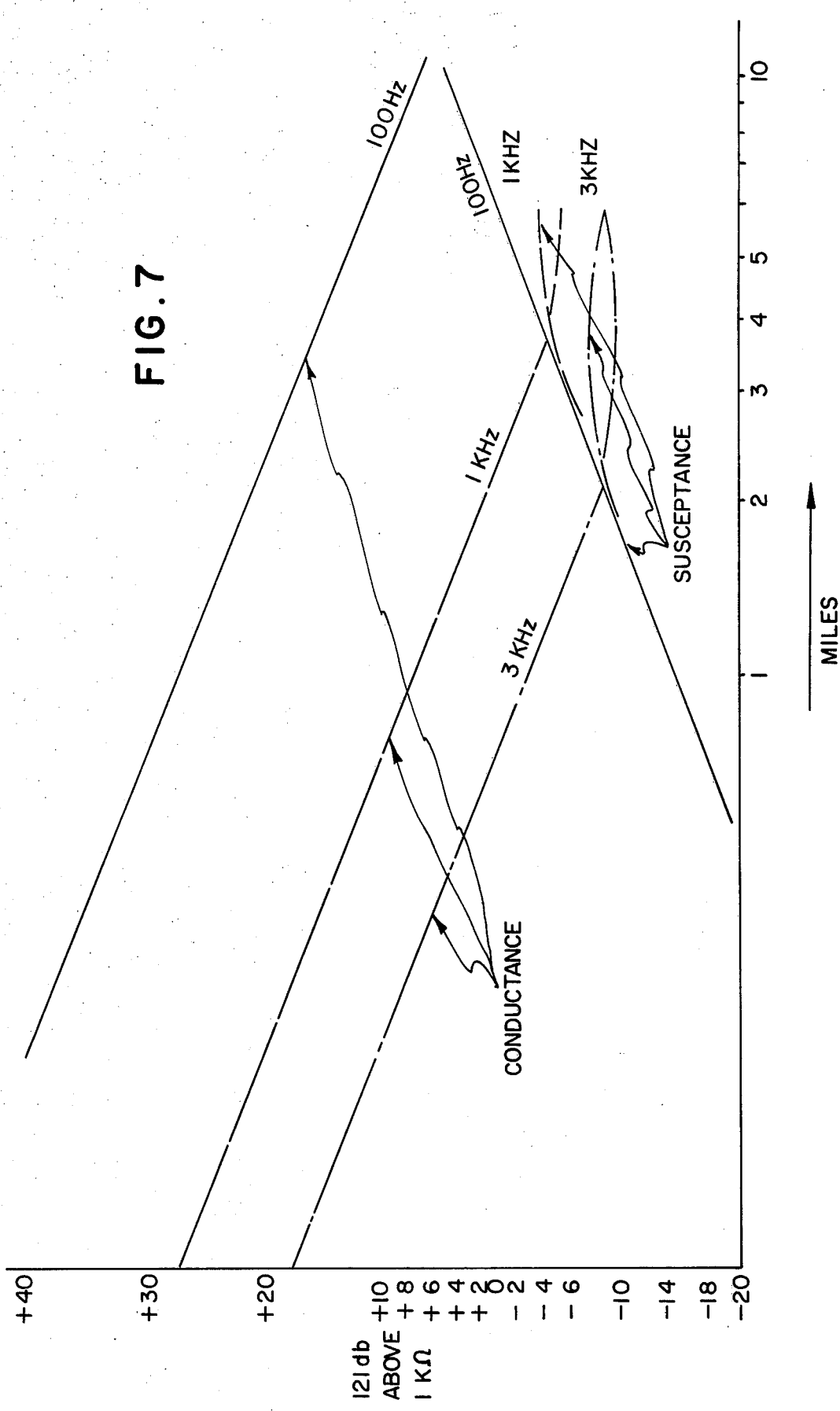
FIG. 7 is an illustration generally in graphic form of the susceptance and conductance characteristics of two-wire telephone lines as a function of distance.

While for a 60 Hz line frequency 30 Hz signals have been employed in the embodiment, it will be understood that signals which are odd multiples or odd submultiples of 30 Hz may be employed, provided, however, that the measurement period does not decrease below 33.3 milliseconds. It may, however, be increased as above indicated. If the frequency is increased beyond 90 Hz, the effective line length which can be examined non-ambiguously is decreased. In situations where the fundamental environmental noise frequency usually power line frequency, differs from 60 Hz, e.g., 50 Hz, the drive signals and measurement periods should be arranged in the same relationship to the line frequency that 30 Hz has to 60 Hz, namely ½ the line frequency or odd multiples or all submultiples of ½ the line frequency. In FIG. 7 there is shown an illustration of the dependence of susceptance and conductance as a function of distance along an aritificial line, expressed as changes in impedance. From this it can be seen that the lower frequency signals provide for non-ambiguous results out to ten miles or more, while higher frequency signals render the measurements ambiguous at these distances.

In the embodiment described the test signal is measured for two successive half cycles, one being reversed in polarity, with the reversal of polarity providing effective cancellation of D.C. noise. The system can, however, operate with a measurement of only one-half cycle, suffering some loss of noise suppression and of signal sensitivity.

We claim:

1. A method for testing two-wire lines in an environment where the predominant power distribution is at a frequency $f_1$, to determine the electrical characteristics thereof comprising the steps of, (a) applying an alternating current waveform of specified frequency to one of said wires, said frequency being substantially $\frac{1}{2} f_1$, a submultiple thereof or an odd harmonic thereof no greater than 250 Hz, (b) measuring the current on the one of said wires to which said alternating current signal has been applied, (c) generating a signal, including a portion proportional to and of the same polarity as that of said measured current for a period equal to an integer number of half cycles of said applied alternating current signal and equal to an integer number of full cycles of $f_1$, (d) and providing an output signal proportional to the integrated value of said generated signal over said period, said period being selected to be in a known phase relationship with said applied alternating current signal.

2. A method in accordance with claim 1 and wherein in step (c) said generated signal includes both said first portion and a second portion, where said second portion is proportional to said measured current, and of reversed polarity from that of said measured current for an equal time period as said first portion and immediately preceding or immediately following the period during which said first portion is generated, and wherein in step (d) said output signal is the integrated value of said generated signal over a period equal to an integer number of one full cycle periods of said applied alternating current signal.

3. A method in accordance with claim 2 wherein said period over which said signal is integrated is in zero phase relationship with the period of said applied alternating current signal.

4. A method in accordance with claim 3 wherein an additional measurement takes place over an equal measurement period in quadrature phase with the period of said applied alternating current signal.

5. A method in accordance with claim 2 wherein additional measurements are made by applying a direct current signal to one of said wires and measuring the current on the one of said wires to which said direct current signal is applied for a measurement period equal to an integer multiple of 33.33 milliseconds or an integral multiple thereof.

6. A method in accordance with claim 2 wherein said applied alternating current signal is a 30 Hz sine wave.

7. A method in accordance with claim 5 wherein said measurement period is equal to 33.33 milliseconds.

8. A method in accordance with claim 5 wherein said period over which said signal is integrated is in zero phase relationship with the period of said applied alternating current signal.

9. A method in accordance with claim 5 wherein an additional measurement takes place over an equal measurement period in quadrature phase with the period of said applied alternating current signal.

10. Apparatus for testing the electrical characteristics of two wire telephone lines in an environment of electrical noise at a predominant frequency $f_1$, comprising, means for generating an alternating current test signal at a frequency equal to $\frac{1}{2} f_1$, or a submultiple of $\frac{1}{2} f_1$ or an odd harmonic of $\frac{1}{2} f_1$ but less than 250 Hz, means for applying said alternating current test signal to a selected one of said telephone wires, signal generating means for generating an electrical signal proportional to the current measurement on said selected telephone wire over a measurement period equal to an integer number of half cycle periods of said alternating current test signal and equal to an integer number of full cycle periods of $f_1$, means for integrating the output signal from said signal generating means for said measurement period and providing an output signal representative of the value of said integrated signal as an indication of an electrical characteristic between the selected one of said wires and said point of potential reference.

11. Apparatus in accordance with claim 10 wherein said signal generating means generates an electrical signal proportional to the current measurement on said selected telephone wire over a measurement period equal to an integer number of full cycle periods of said alternating current test signal, and wherein said means includes means for reversing the polarity of said generated signal during alternate successive periods equal to one-half cycle period of said alternating current test signal to produce said measured current, with alternate half cycles being of reversed polarity from that of the measured current.

12. Apparatus in accordance with claim 11 wherein said measurement period is selected to be in 0° phase relationship with the period of said applied alternating current test signal.

13. Apparatus in accordance with claim 11 wherein said measurement period is selected to be in quadrature phase relationship with the period of said applied alternating current test signal.

14. Apparatus in accordance with claim 11 wherein said alternating current test signal is at a frequency of 30 Hz and said measurement period is selected to be 33.33 milliseconds.

15. Apparatus in accordance with claim 14 wherein said measurement period is selected to be in 0° phase relationship with the period of said applied alternating current test signal.

16. Apparatus in accordance with claim 14 wherein said measurement period is selected to be in quadrature phase relationship with the period of said applied alternating current test signal.

17. Apparatus in accordance with claim 11 and including additional reference signal means providing as an additional input to said integrating means a reference signal derived by full wave rectifying said alternating current test signal for a period equal to said measurement period.

18. Apparatus in accordance with claim 11 wherein said means for applying said alternating current test signal and said signal generating means are formed such that the alternating current test signal is applied as a voltage between a point of potential reference and said selected wire and said signal proportional to the measured current in the time said alternating current test signal is applied to said selected wire is provided as an output voltage signal between an output terminal and said point of potential reference.

19. A method for testing an electrically conductive line in an environment where the predominant power distribution is at a frequency $f_1$, to determine the electrical characteristics thereof, comprising the steps of:

applying to said line a periodic electrical input of specified frequency $f_2$ to generate a signal, $f_2$ being $\frac{1}{2}f_1$, a submultiple of $\frac{1}{2}f_1$, or an odd harmonic of $\frac{1}{2}f_1$, and providing an output signal proportional to the average value of said generated signal over a period equal to the length of an integer number of full cycles of $f_1$ and equal to the length of an integer number of half cycles of $f_2$ selected to make said average non-zero.

20. The method of claim 19 wherein said period is equal to the length of an integer number of full cycles of $f_2$, and the polarity of said generated signal is reversed during alternate half cycles of $f_2$.

21. The method of claim 19 wherein said period is in zero phase relationship with said input.

22. The method of claim 21 further comprising the step of providing an additional output signal proportional to the average value of said generated signal over a said period which is in quadrature phase relationship with said input.

23. The method of claim 20 further comprising the steps of applying a direct current signal to said line to generate a further signal, and providing an output signal proportional to the average value of said further signal over a period equal to an integer multiple of 33.33 milliseconds.

24. The method of claim 19 wherein said input is a 30 Hz sinusoid.

25. The method of claim 24 wherein said period is 33.33 milliseconds.

26. The method of claim 19 wherein said line is a telephone line.

27. The method of claim 19 wherein said line comprises a plurality of wires.

28. The method of claim 19 wherein $f_2$ is no greater than 250 Hz.

29. The method of claim 19 wherein an integrator is used to provide as said output signal a signal proportional to the integrated value of said generated signal over said period.

30. The method of claim 19 wherein said input is applied as a voltage between a point of potential reference and a wire in said line, and said output signal is provided as a voltage between an output terminal and said point of potential reference.

31. Apparatus for testing an electrically conductive line in an environment where the predominant power distribution is at a frequency $f_1$, to determine the electrical characteristics thereof, comprising:

input circuitry means for applying to said line a periodic electrical input of specified frequency $f_2$ to generate a signal, $f_2$ being $\frac{1}{2}f_1$, a submultiple of $\frac{1}{2}f_1$, or an odd harmonic of $\frac{1}{2}f_1$, and output circuitry means for providing an output signal proportional to the average value of said generated signal over a period equal to the length of an integer number of full cycles of $f_1$ and equal to the length of an integer number of half cycles of $f_2$ selected to make said average non-zero.

32. The apparatus of claim 31 wherein said period is equal to the length of an integer number of full cycles of $f_2$, and the polarity of said generated signal is reversed during alternate half cycles of $f_2$.

33. The apparatus of claim 31 wherein said period is in zero phase relationship with said input.

34. The apparatus of claim 33 further comprising means for providing an additional output signal proportional to the average value of said generated signal over a said period which is in quadrature phase relationship with said input.

35. The apparatus of claim 32 further comprising means for applying a direct current signal to said line to generate a further signal, and means for providing an output signal proportional to the average value of said further signal over a period equal to an integer multiple of 33.33 milliseconds.

36. The apparatus of claim 31 wherein said input is a 30 Hz sinusoid.

37. The apparatus of claim 36 wherein said period is 33.33 milliseconds.

38. The apparatus of claim 31 wherein said line is a telephone line.

39. The apparatus of claim 31 wherein said line comprises a plurality of wires.

40. The apparatus of claim 31 wherein $f_2$ is no greater than 250 Hz.

41. The apparatus of claim 31 further comprising an integrator to provide as said output signal a signal proportional to the integrated value of said generated signal over said period.

42. The apparatus of claim 31 wherein said input circuitry means includes means for providing said input as a voltage between a point of potential reference and a wire in said line, and said output circuitry means includes means for providing said output signal as a voltage between an output terminal and said point of potential reference.

43. A method in accordance with claim 1 wherein all said integer numbers are one and said specified frequency is 30 Hz.

44. Apparatus in accordance with claim 10 wherein all said integer numbers are one and said specified frequency is 30 Hz.

45. A method in accordance with claim 19 wherein all said integer numbers are one and $f_2$ is 30 Hz.

46. Apparatus in accordance with claim 31 wherein all said integer numbers are one and $f_2$ is 30 Hz.

47. The apparatus of claim 38 wherein $f_1$ is 60 Hz.

* * * * *